United States Patent Office 3,359,311
Patented Dec. 19, 1967

3,359,311
PROCESS FOR COLOR IMPROVEMENT OF
β-VINYLADIPIC ACID
Robert H. Perry, Jr., Springfield, N.J., and Leroy C. Jennings, Baytown, Tex., assignors, by mesne assignments, to Esso Research and Engineering Company, Elizabeth, N.J., a corporation of Delaware
No Drawing. Filed Dec. 11, 1964, Ser. No. 417,820
8 Claims. (Cl. 260—537)

ABSTRACT OF THE DISCLOSURE

Off-color crystalline β-vinyladipic acid is treated to improve the color by dissolving the β-vinyladipic acid in a hydrocarbon solvent, such as benzene (e.g., 5 to 30 parts of acid per 100 parts of benzene, by weight), at an elevated temperature (such as 45° C.), along with a small amount of water (e.g., 0.05 to 1.0 part of water per 100 parts of benzene, by weight), and thereafter cooling the solution to allow a dark-colored oil layer to form (e.g., at a temperature of 15° to 30° C.). The dark-colored oil layer may be separated from the solution and purified β-vinyladipic acid thereafter recovered from the solution by crystallization.

---

The present invention relates to the improvement of color of crystalline β-vinyladipic acid. More specifically, the present invention relates to the improvement of color in crude β-vinyladipic acid by dissolving the acid in a hydrocarbon solvent at an elevated temperature, along with a small quantity of water, and cooling the solution to allow formation of a dark-colored oil layer which can be removed, and colorless β-vinyladipic acid then recovered from solution in the solvent.

The present invention is directed to the purification of β-vinyladipic acid, a difunctional acid which has a vinyl group attached to the backbone of the acid structure. The β-vinyladipic acid can be used as a replacement for adipic acid, as a means for introducing a vinyl functionality.

The β-vinyladipic acid which is the subject of the purification step of the present invention can be prepared as follows. 4-vinylcyclohexene is monoozonized to cleave the cyclohexene ring while leaving the vinyl group unreacted, and the resulting ozonide oxidized to provide carboxylic acid groupings at each of the cleft ends of the ring. The monoozonlysis can be carried out as set forth in Example 1 following. However, upon recovery of the vinyladipic acid product, it has been found that even after ether extraction, the crude vinyladipic acid exhibits an off-white or yellow cast. It has been found that the color can be dramatically improved and a substantially colorless β-vinyladipic acid product obtained, with only moderate losses of adipic acid, by dissolving the crude β-vinyladipic acid in a hydrocarbon solvent, at an elevated temperature, in the presence of a small amount of water, after which the solution is cooled to allow the formation of a dark-colored oil layer which contains substantially all of the color-bearing materials which were present in the crude β-vinyladipic acid. This dark-colored layer will form as a supernatant phase or a bottoms phase, depending on the particular solvent which is used, but in either event it is immiscible with the solvent and can be separated therefrom by decantation. The withdrawn dark-colored layer can be recrystallized to recover some of the crude β-vinyladipic acid which is contained therein.

In the purification and color improvement process of the present invention, the β-vinyladipic acid can be dissolved in a solvent chosen from the group consisting of toluene, xylenes, polymethyl benzenes (such as mesitylene, pseudocumene, hemimellitene, durene, etc.), chlorinated benzene, such as dichlorobenzene, chlorobenzene, etc., chlorinated paraffinic hydrocarbons such as chloroform and carbon tetrachloride, etc. The aromatic solvents are preferred, and benzene is the preferred solvent among the aromatic solvents.

The crystalline crude β-vinyladipic acid is dissolved in the solvent to give a weight concentration within the range of 5 to 30%, 10 to 20% being preferred. Thus, on the basis of 100 parts by weight of solvent, 5 to 30 parts by weight of solid β-vinyladipic acid will be dissolved therein. From 0.05 to 1.0 part by weight of water will be added to the solution. The upper limit is dictated by the fact that the β-vinyladipic acid product is soluble in water, and larger volumes of water will remove larger quantities of the desired product from the benzene solution, whereas, the smaller quantities of water are sufficient for breaking out and removing the color-bearing bodies but carry out lesser quantities of dissolved acid. Thus, the water should be used in quantities as small as possible so that the amount of desired product which is removed as part of the color-removal process can be kept as low as possible.

The time at which the β-vinyladipic acid and solvent are maintained at an elevated temperautre is determined by the stirring efficiency or the ability to get the vinyladipic acid into solution in the benzene. The temperature will affect this time relationship, and the temperature can range from 40 to 50° C., preferably 45° C.

The water can be added to the mixture of vinyladipic acid and solvent at any time, before, after, or during the admixture of vinyladipic acid with the benzene. Alternatively, a wet adipic acid cake can be employed which carries the moisture along with it, thereby obviating the necessity for adding water as a separate step.

After both the water and β-vinyladipic acid are in solution in the solvent, the solution is cooled to a temperature of 15 to 30° C. (preferably 20 to 25° C.) to allow the formation of a dark-colored oil layer, which can be then removed by decantation either of the oil layer or of the clear solution. The temperature is maintained within the recited range in order to avoid cooling the solution to the point where crystals of β-vinyladipic acid will be precipitated and admixed with the oil layer where the oil layer is a bottoms layer (as will be the case when using benzene as the solvent).

Thus, it is seen that the present invention, as above set forth and as more particularly hereinafter described, provides a method for producing substantially colorless crystals of β-vinyladipic acid without suffering extreme losses incumbent in the recrystallization scheme of purification.

Example 1

β-Vinyladipic acid was produced as follows. In a reaction zone, 0.5 mol (54 g.) of 4-vinylcyclohexene which had been prepurified to remove peroxides was ozonized in solution with 450 ml. of acetone by passing 0.08 cubic feet per minute of gas containing about 3.5 weight percent ozone through the solution at —78° C. until 260 liters of exit gas were indicated. This was an indication that 0.25 mol of ozone had been absorbed. The solvent was removed under reduced pressure, leaving 54.2 g. of a peroxidic gel. The gel was slurried with 150 ml. of acetone and 100 ml. of methanol, and subsequently added along with 100 ml. of water to a vessel fitted with a stirrer. The mixture was heated to boiling and a large portion (184 ml.) of the acetone and methanol was distilled off. At 70° C. vapor temperature and 78° C. pot temperature, distillation was stopped and the mixture cooled to 25° C.

Silver oxide (10 g.) and 50 ml. of methanol were added to the vessel and a reflux condenser was attached thereto. Oxygen at the rate of 0.02 cubic feet per minute was passed through the stirred suspension. After 5 minutes, addition of a solution of 20 g. of sodium hydroxide and 50 ml. of water was begun. This addition was accomplished dropwise over a period of 1¼ hours while the temperature of suspension was maintained at 30 to 35° C. by means of a cooling bath. The pH was maintained between pH 10 and pH 12. Oxygen was passed through the suspension for a period of 15 minutes after the addition of the sodium hydroxide solution was completed, after which the suspension was filtered and the filtrate acidified by the addition of dilute hydrochloric acid to a pH value of pH 2. The volume of solution was reduced to one-half by vacuum distillation and the solution was then extracted with six 100 ml. portions of ether. The organic solutions resulting from the extraction were evaporated under reduced pressure to give 42.2 g. of nonvolatile residues. A small sample of this crude residue was converted, using diazomethane, to methyl esters and the methyl esters separated by partition chromatographic means using an Apiezon L substrate on firebrick support. Based on these data, the selectivity of the reaction to $\beta$-vinyladipic acid was calculated to be 89.5%. This general procedure was repeated several times with selectivities being 80 to 90% for $\beta$-vinyladipic acid.

The ether extract, which yielded the crude crystalline $\beta$-vinyladipic acid, produced 95% purity $\beta$-vinyladipic acid. The crude, crystalline $\beta$-vinyladipic acid was off-white or slightly yellow in color, but was purified in accordance with the present invention as follows.

Example 2

The crude $\beta$-vinyladipic acid produced in Example 1 was added to benzene, using one liter of benzene for each 100 g. of crude product. The mixture was heated to 46 to 47° C. to dissolve the solid, and an amount of distilled water corresponding to 0.01 ml. per gram of crude product was added to the benzene solution with stirring. The small quantity of water proved to be very powerful in extracting dark-colored impurities from the benzene solution. The hot benzene solution was allowed to cool to room temperature, thereby permitting the dark-colored, aqueous extract to separate as a dense phase. The $\beta$-vinyl adipic acid solution in benzene was the top phase, with the dark-colored extract phase as a bottoms phase. The supernatant liquid was decanted and chilled in an ice bath several hours to permit vinyladipic acid to crystallize. The precipitate was then filtered from the benzene solution using a Büchner fritted glass funnel. It was then washed three times with cool petroleum ether and suction dried. The product at this stage was generally colorless and was usually 98 to 99+% pure.

Representative data of a number of runs is shown below in Table I.

By advertence to the data shown in Table I, it is seen that the amount of oily layer that forms can vary from run to run. Specifically, comparing Runs 1 and 2, where essentially the same amount of crude vinyladipic acid is charged to the purification process, essentially the same oil content is found. However, comparing Runs 1 and 4, it is seen that Run 4 which contained only 697 g. of $\beta$-vinyladipic acid produced 300 g. of oily layer, essentially the same as that produced from 862 g. of Run 1.

However, even though this variation in oil content is apparent, the $\beta$-vinyladipic acid recovered as a pure product was essentially the same percentage-wise in each case.

Comparing Runs 1 and 5, wherein essentially the same amount of crude $\beta$-vinyladipic acid was charged to purification, the use of half as much water in Run 5 resulted in an increase in the recovery of $\beta$-vinyladipic acid from 54% to 69%; but in comparing Runs 6 and 9, where Run 6 employed only half as much water as Run 9, an apparent increase recovery of only 3% (from 74 to 77%) was obtained. However, the use of the smaller amount of water in each case is shown to be at least as effective in the removal of the oily color-bearing material, and to produce at least the same percentage recovery of purified $\beta$-vinyladipic acid.

Having disclosed the present invention in detail, and having set forth a preferred embodiment of the same in Example 2, what is desired to be protected by Letters Patent should be limited not by the specific embodiment herein given, but rather by the appended claims.

We claim:

1. A method of improving the color of crude $\beta$-vinyladipic acid produced by the ozonization of 4-vinylcyclohexene which comprises forming a solution of from 5 to 30 parts by weight of crude $\beta$-vinyladipic acid and from 0.05 to 1.0 part by weight of water in 100 parts by weight of a solvent chosen from the group consisting of benzene, toluene, xylene, polymethylbenzene, chlorinated benzenes, and chlorinated paraffin hydrocarbons, at a temperature sufficient to dissolve said $\beta$-vinyladipic acid in said solvent, cooling said solution to a lower temperature above the crystallization temperatrue of $\beta$-vinyladipic acid, at which a dark-colored oil layer forms, separating said dark-colored oil layer from said solution, and recovering $\beta$-vinyladipic acid from said solution as a substantially colorless product.

2. A method in accordance with claim 1 wherein the crude $\beta$-vinyladipic acid is dissolved in the solvent at a concentration of from 10 to 20 parts by weight per 100

TABLE I.—REPRESENTATIVE VINYLADIPIC ACID PURIFICATION DATA

| Run No. | Crude Product [1] | | Water Added to Benzene Solution | | Recrystallized Product | | Wt. Percent Recovery | Total Acids by Titration, Wt. Percent [3] |
|---|---|---|---|---|---|---|---|---|
| | To Purification, g. | Dissolved in Hot Benzene, Liters | Cc. | Resulting Oily, Black, Bottom Layer Removed, g.[2] | From chilled, Top Layer Benzene, g. | From Conc. Benzene Filtrate, g. | | |
| 1 | 862 | 8.6 | 8.6 | 315 | 384 | 79 | 54 | 98.7 |
| 2 | 829 | 8.3 | 8.3 | 288 | 405 | 52 | 55 | 99.7 |
| 3 | 930 | 9.3 | 9.3 | 472 | 329 | 53 | 41 | 99.8 |
| 4 | 697 | 7.0 | 7.0 | 300 | 326 | 33 | 52 | 99.7 |
| 5 | 873 | 8.7 | 4.4 | | 545 | 59 | 69 | 99.3 |
| 6 | 527 | 5.3 | 2.7 | | 378 | 26 | 77 | 98.6 |
| 7 | 891 | 8.9 | 8.9 | Combined | 629 | 51 | 76 | 98.5 |
| 8 | 912 | 9.1 | 9.1 | | 651 | 38 | 76 | 98.3 |
| 9 | 520 | 5.2 | 5.2 | | 361 | 22 | 74 | 98.5 |

[1] Crystallized to 85–90% purity from concentrated ethyl ether extract from acidified oxidation product.
[2] This material re-dissolved in hot benzene, cooled, and concentrated to give a small additional yield of vinyladipic acid crystals.
[3] Essentially all vinyladipic (98–99+%). Trace impurities not identified but thought to be mostly succinic acid.

parts by weight of solvent, and the temperature at which the oil layer forms is from 15 to 30° C.

3. A method in accordance with claim 2 wherein the temperature is within the range of 20 to 25° C.

4. A method in accordance with claim 3 wherein the solvent is benzene.

5. A method in accordance with claim 4 wherein the temperature at which the β-vinyladipic acid is dissolved is about 45° C.

6. A method of improving the color of crude β-vinyladipic acid produced by the ozonization of 4-vinylcyclohexene which comprises dissolving from 5 to 30 parts by weight of crude crystalline β-vinyladipic acid in 100 parts by weight of a benzene, heating the solution to about 45° C., adding from 0.05 to 1.0 part by weight of water to the heated solution, maintaining at 45° C. until the water dissolves, then cooling to a temperature from 20 to 25° C. to form a dark-colored oil layer, separating said oil layer from said solution, and recovering β-vinyladipic acid from said solution as a substantially colorless product.

7. A method in accordance with claim 6 wherein the β-vinyladipic acid is recovered by crystallization from the benzene solution.

8. A method in accordance with claim 6 wherein the β-vinyladipic acid is recovered from the benzene solution by evaporation of the benzene solvent.

References Cited

UNITED STATES PATENTS

| | | | |
|---|---|---|---|
| 2,776,990 | 1/1957 | Hines | 260—533 |
| 3,202,704 | 8/1965 | Perry | 260—537 |

LORRAINE A. WEINBERGER, *Primary Examiner.*

R. K. JACKSON, *Examiner.*

V. GARNER, *Assistant Examiner.*